United States Patent
Benthien et al.

(10) Patent No.: US 11,187,256 B2
(45) Date of Patent: Nov. 30, 2021

(54) FASTENING SYSTEM FOR FASTENING FITTINGS TO A RAIL IN A VEHICLE

(71) Applicant: Airbus Operations GmbH, Hamburg (DE)

(72) Inventors: Hermann Benthien, Hamburg (DE); Rieke Bassen, Hamburg (DE); Alexander Horn, Hamburg (DE); Kristina Ihfe, Hamburg (DE); Marvin Bruhn, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 351 days.

(21) Appl. No.: 16/275,006

(22) Filed: Feb. 13, 2019

(65) Prior Publication Data

US 2019/0257331 A1 Aug. 22, 2019

(30) Foreign Application Priority Data

Feb. 16, 2018 (DE) .................. 102018103514.4

(51) Int. Cl.
| | |
|---|---|
| *F16B 5/02* | (2006.01) |
| *B64F 5/10* | (2017.01) |
| *B64C 1/18* | (2006.01) |

(52) U.S. Cl.
CPC .............. *F16B 5/02* (2013.01); *B64C 1/18* (2013.01); *B64F 5/10* (2017.01)

(58) Field of Classification Search
CPC ... F16B 5/02; F16B 5/12; B60N 2/015; B60N 2/01516; B60N 2/01575; B60N 2/24
See application file for complete search history.

(56) References Cited

U.S. PATENT DOCUMENTS

| | | | | |
|---|---|---|---|---|
| 4,878,640 | A * | 11/1989 | Fricker | E04B 1/4107 248/297.21 |
| 6,406,210 | B1 * | 6/2002 | Parrish | F16B 5/02 403/16 |
| 10,589,835 | B2 * | 3/2020 | Mills | F16B 19/1081 |
| 10,934,003 | B2 * | 3/2021 | Bowker | B64D 11/0696 |
| 10,981,198 | B2 * | 4/2021 | Persson | B07B 1/4645 |

FOREIGN PATENT DOCUMENTS

| | | |
|---|---|---|
| DE | 564834 C | 11/1932 |
| DE | 19812490 A1 | 9/1999 |
| DE | 102007004554 A1 | 7/2008 |
| DE | 102009028533 A1 | 2/2011 |
| DE | 102009028534 A1 | 2/2011 |
| EP | 0922632 A2 | 6/1999 |

* cited by examiner

*Primary Examiner* — Jason L Vaughan
*Assistant Examiner* — Amanda Kreiling
(74) *Attorney, Agent, or Firm* — Nixon & Vanderhye P.C.

(57) ABSTRACT

A fastening system for fastening fittings to a rail has a supporting element, an opening, and a first radial toothing in an interior space adjoining the opening. The system also has an anchoring element having a second radial toothing. The opening of the supporting element and the first radial toothing are configured in a corresponding manner to the anchoring element such that the anchoring element, in a first rotational position, can be introduced without resistance into the opening and, in a second rotational position, produces an engagement between the first radial toothing and the second radial toothing. At least one form-fitting means is arranged at a first end of the anchoring element and can be introduced into an opening contour of a rail, for producing and releasing a form-fitting connection to an undercut of a rail.

14 Claims, 5 Drawing Sheets

FASTENING SYSTEM FOR FASTENING FITTINGS TO A RAIL IN A VEHICLE

CROSS-REFERENCE TO PRIORITY APPLICATION

This application claims the benefit of, and priority to, German patent application number DE 102018103514.4, filed Feb. 16, 2018. The content of the referenced application is incorporated by reference herein.

TECHNICAL FIELD

Embodiments of the subject matter described herein relate generally to a fastening system for fastening fittings to a rail in a vehicle, to a vehicle cabin with at least one rail and at least one fitting part which is fastened to the rail with the aid of a fastening system of this type, to a vehicle with a vehicle cabin of this type, and to a method for fastening a fitting part to a rail in a vehicle.

BACKGROUND

There are customarily a multiplicity of fittings in means of transport, for example passenger aircraft. In addition to passenger seats, said fittings can also be included as monuments in the form of toilets, galley kitchens, storage compartments or mixed, modularly constructed monuments. It is customary for this purpose to provide the structure of a vehicle body with a multiplicity of holders which can carry and fix the respective monument. In addition to the use of holders arranged on side surfaces of a body structure, holders are also known which are connectable to rails arranged in a floor.

Patent documents DE 10 2009 028 533 A1 and DE 10 2009 028 534 A1 disclose, for example, fastening systems for guiding and releasably fastening a module on and to guide rails in an aircraft.

BRIEF SUMMARY

It can be highly advantageous to mount fitting parts within a vehicle in a simplified and flexible manner, the mounting nevertheless leading to at least just as good a conduction of forces between a vehicle structure and the fitting parts as in the case of conventional methods and devices.

An object of the disclosure relates to providing a fastening system for fastening fittings to a rail in a vehicle, said fastening being able to be carried out as rapidly, precisely and conveniently as possible.

The object is achieved by a fastening system with the features of independent claim 1. Advantageous developments and embodiments can be gathered from the dependent claims and the description below.

A fastening system for fastening fittings to a rail in a vehicle is proposed, the fastening system having a supporting element with a supporting surface, an opening and a first radial toothing which is arranged in an interior space adjoining the opening and is limited to two radial portions lying opposite in the interior space, and an elongate anchoring element with a longitudinal axis, a first end, a second end arranged along the longitudinal axis opposite the first end, and a second radial toothing limited to two mutually opposite radial portions, wherein the opening of the supporting element and the first radial toothing are configured in a corresponding manner to the anchoring element such that the anchoring element, in a first rotational position about the longitudinal axis, can be introduced without resistance into the opening and, in a second rotational position, produces an engagement between the first radial toothing and the second radial toothing, and wherein at least one form-fitting means is arranged at the first end of the anchoring element and can be introduced into an opening contour of a rail, for producing and releasing a form-fitting connection to an undercut of a rail.

The fastening system according to the disclosure consequently essentially has two interacting elements. The elongate anchoring element can easily be plugged into the supporting element and, by rotation about its longitudinal axis, can be brought into connection with the supporting element. As will be explained in detail further below, the supporting element can be connected in a completely variable manner along the longitudinal axis to the anchoring element. At the same time, the anchoring element can be caused by the form-fitting means to enter into a form-fitting connection with the rail as required. The supporting element can simultaneously be connected to the fitting part to be fastened and can be provided for resting on an upper side of the relevant rail. By means of the configuration according to the disclosure, a highly flexible and simply producible fastening of a fitting part to a rail can take place without arranging fixedly predetermined fastening points on said rail itself.

The supporting element is provided to be placed on an upper side of the relevant rail. By placing it thereon, forces which are directed towards the rail can be introduced into the rail. If the rail is arranged, for example, in a floor of a cabin, the resting of the supporting element on the rail makes it possible for forces which run in the vertical direction to be introduced. Said forces can be in particular weight forces or mass forces. If a substantially horizontally running rail is provided on a wall structure or similar, horizontal forces can sooner be consequently absorbed by the supporting element depending on the precise position.

The anchoring element can be understood as being a pin, bolt, rod or plate-like body with an elongate shape, which has a toothing on just two mutually opposite portions of a profile cross section. Said toothed portions run parallel to the longitudinal axis of the anchoring element and are arranged on radially outer edges of the profile cross section.

Within this context, the profile cross section should be understood as meaning the surface which runs perpendicularly to the longitudinal axis of the anchoring element. The cross section of the anchoring element can be based, inter alia, on a circular shape which is flattened on two mutually opposite sides, i.e. has two flattened flanks. The circumferential region of the profile cross section that lies between the flanks can have the second toothing here, while the two flanks mentioned do not have any toothing. The second radial toothing is configured in the form of flutes which could look, for example, like threads of a screw, but preferably do not have any pitch here.

The opening, the first radial toothing and the second radial toothing are configured in such a manner that the anchoring element, in a certain rotational position about its longitudinal axis, can be introduced into the opening or the interior space of the supporting element. The first rotational position can be referred to as the insertion position. In said insertion position, the toothed portions of the interior space and of the anchoring element are offset with respect to each other, and the second radial toothing is moved upon insertion past untoothed portions of the interior space. Only by subsequent rotation of the anchoring element about its longitudinal axis does the second radial toothing enter into engagement with the first radial toothing.

By arranging the form-fitting means on the anchoring element, a loadable connection between the anchoring element and the rail is additionally selectively produced. At least one shape feature which, inter alia, can include the undercut of the rail, is gripped in the manner of tongs when the form fit of the supporting element and the form-fitting means is produced. Said form fit makes it possible to prevent the anchoring element from being able to be detached from the rail from a rail cavity which is bounded at least on one side by the undercut. In addition, fixing in the opposite direction is brought about by the supporting element. The form-fitting means permits a flexible connection to the relevant rail since it is not necessary to provide any fixed fastening points to which the fitting part has to be fastened. On the contrary, it can suffice to position the fitting part at the rail in order then to undertake fixing to the rail in a flexible manner and optionally in the grid of the rail.

Furthermore, positioning of the supporting element and of the anchoring element in a variable manner with respect to each other along the longitudinal axis can take place by means of the radial toothings. By positioning the fitting part and simple rotation of said two components with respect to each other, the toothings enter into engagement in this position and provide a permanent connection irrespective of the actual position. It is therefore possible not only to take into consideration walls of differing thickness or other features of the fitting part concerned, but also to very easily compensate for tolerances which occur during the manufacturing or mounting.

In summary, the fastening system according to the disclosure results in a very flexible and loadable system for fastening fitting parts to a rail without providing rigid fastening points.

It is furthermore pointed out in this connection that the rail can be designed in particular as a floor rail. A floor rail of this type can correspond to a "Douglas Rail" which is customary, for example, in aircraft manufacturing and which has an elongate extent and includes, for example, a flat base in the manner of a strip on which two spaced-apart projections are located which are separated from each other by a slot and enclose a flat cavity with the base. The slot is furthermore penetrated by grid openings which are distributed at a predetermined distance, which is customarily one inch, from one another along the floor rail and extend through the projections. The grid openings customarily serve to introduce mushroom-like locking elements of a holding means arranged on the projections into the cavity, to displace said locking elements between two adjacent grid openings into a tapering region with little local distance between the two projections and then to clamp same with the projections by means of an action of force. The floor rail is mechanically connected to a carrying structure of the transport means, and therefore loads can be introduced from the floor rail into the structure of the transport means. The protrusions can be adapted to said grid and to said grid openings in the floor rail should fastening to a floor rail of this type take place.

The fastening system preferably furthermore has a fixing device for fixing a relative position between the anchoring element and the supporting element. The fixing device can serve in particular to prevent rotation of the anchoring element. This can be achieved by a plurality of different devices which permit fixing of the anchoring element to a structure-mounted part or to the supporting element. The structure-mounted part can be, for example, a base surface or a wall surface of the fitting part, a cabin taking in the fitting part, or the rail itself. The fixing device can be formed, inter alia, by means of securing pins, split pins, latching elements or the like.

In an advantageous embodiment, the supporting element has a supporting surface on which at least one protrusion is arranged, said protrusion being designed to enter into a form fit with an opening contour of the rail. By entering into a form fit, the position of the supporting element on the rail can be fixed at least in one dimension. In particular in the case of floor rails mentioned above, it can be conceivable for a protrusion with circular grid openings to be correspondingly configured, and therefore displacement of the supporting element in two dimensions is prevented. The holding of the supporting element can be reliably prevented here irrespective of a clamping force which may be present.

Particularly preferably, two protrusions are arranged on mutually opposite sides of the supporting surface, said protrusions being designed to enter into engagement with two spaced-apart grid openings in the opening contour of the rail. Particularly in the event of a floor rail with spaced-apart grid openings, it may be appropriate to use two symmetrically arranged protrusions in order to avoid jamming. For the flush engagement in a grid opening, one such protrusion can be based on a circular shape or can at least have portions of a circular shape. If the two protrusions are inserted into grid openings of a rail, the supporting surface is located centrally between the protrusions and can introduce the force into the rail centrally and symmetrically with respect to the protrusions.

The supporting element can have an annular bushing in which the opening is arranged. The formation of the supporting element with an annular bushing permits the supporting element to be very easily integrated at or in the fitting part to be fastened. For example, such an annular bushing could be inserted into a correspondingly shaped opening of a wall surface or base surface of a fitting part. It could also be appropriate to provide the annular bushing with an external thread and to screw the latter into an opening with a corresponding internal thread in a wall surface or base surface of the fitting part. The annular bushing can optionally have an extent along a longitudinal axis that permits the additional screwing on of a lock nut. The manufacturing of such a component is furthermore quite simple and the size of the supporting surface could be selected depending on the dimensioning of the annular bushing.

The form-fitting means can furthermore have two mutually oppositely arranged engagement elements which follow the second toothing along the longitudinal axis of the anchoring element. One engagement element can be designed as a foot or a wedge with rounded corners. It is clear that the engagement elements correspond to a configuration of a cavity of the rail, and therefore the form fit is produced there. The engagement elements can be dimensioned in such a manner that they are insertable through the opening contour of the rail into the cavity of the rail. If the floor rail illustrated above forms the foundation, it would be possible to insert the engagement elements through a central slot of the floor rail into the cavity thereof. The shape of the form-fitting means formed by the two engagement elements could therefore basically be of elongate configuration. The engagement elements are preferably located on a plane which is perpendicular to the longitudinal axis. The two engagement elements lie offset by 180° with respect to each other on the plane. The width of the engagement elements should fall slightly short of the width of the central slot.

Furthermore, the overall length of the form-fitting means should be slightly below the width of the cavity of the rail. By rotation of the anchoring element in particular by 90°, the engagement elements are rotated from an orientation parallel to the longitudinal extent of the rail or to the central slot located therein into an orientation transversely with respect to the central slot or the longitudinal extent. Furthermore, the engagement elements should be shaped in such a manner that, in the rotated orientation, the rail cavity profile formed perpendicularly to the longitudinal extent is filled as much as possible. In combination with the supporting element, a tong-like engagement around shape features of the rail therefore takes place.

The maximum radial extent of the form-fitting means preferably corresponds at most to the maximum radial extent of the second radial toothing. As a result, it is easily possible to move the anchoring element through the supporting element into the rail with the fitting part already positioned.

A device for initiating a rotation of the anchoring element about the longitudinal axis thereof can be arranged at the second end of the anchoring element. In particular, this can be a tool-holding profile. Rotation of the anchoring element can therefore be carried out without means necessary for this purpose having to be permanently arranged on the anchoring element. In particular, slots, square profiles, hexagonal profiles and the like in the form of an elevation or depression may be appropriate.

The anchoring element can have a profile cross section which is based on a circular shape and has two mutually oppositely arranged flattened flanks, wherein the second toothing is arranged on the circumferential side exclusively at the regions located between the flattened flanks. Overall, the anchoring element can therefore have a flat shape, wherein a toothing, the circumferential contours of which lie on a circular path, is arranged at longitudinal edges. The thickness of the anchoring element and therefore the strength of the second radial toothing can be adapted to the loads to be anticipated.

The fixing device can be a lever which is connected pivotably about an axis to the anchoring element and, at an end facing away from the anchoring element, has a connecting element for connecting to the fitting part or to a structure-mounted point. The lever can then even be used for rotating the anchoring element by being gripped and moved by said facing-away end about the longitudinal axis of the anchoring element. The second rotational position can be taken up and held by movement of the connecting element to a designated connecting point.

As an alternative thereto, the fixing device can furthermore have an elongate body which can be plugged into the opening of the supporting element when the anchoring element is in the second rotational position. Securing against rotation can therefore be achieved very simply and efficiently.

A substantially cylindrical, untoothed portion can be arranged between the form-fitting means and the second radial toothing. According to the above description, the second radial toothing acts on elements which are arranged outside a cavity of the rail. Furthermore, an undisturbed rotation of the anchoring element about the longitudinal axis thereof is intended to be possible. It is consequently appropriate, in order to facilitate the operation and tensioning of the anchoring element, to provide a cylindrical region which serves as a connection between a toothed part of the anchoring element and the form-fitting means.

The disclosure furthermore relates to a vehicle cabin with at least one rail and at least one fitting part which is fastened to the at least one rail with the aid of a fastening system explained above.

The rail here can be a floor rail which is integrated in a cabin floor and has an opening contour facing the cabin.

The disclosure also relates to a vehicle having a vehicle cabin with the features mentioned above.

The vehicle is preferably an aircraft. The fitting part can be designed, for example, in the form of a monument.

Finally, the disclosure relates to a method for installing fittings on a body structure in a vehicle, having the steps of providing the fitting part, positioning the fitting part in a cabin of the vehicle on or at a rail, arranging a supporting element on the fitting part, plugging an anchoring element through the supporting element into the rail, and rotating the anchoring element by 90°.

In addition, the arranging of the supporting element can take place before the positioning of the fitting part.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Further features, advantages and possible uses of the present disclosure will emerge from the following description of the exemplary embodiments and from the figures. Here, all of the features described and/or illustrated in the figures, individually and in any desired combination, form the subject matter of the disclosure even independently of their composition in the individual claims or the back-references thereof. Furthermore, in the figures, the same reference signs are used for identical or similar objects.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Figure 1:
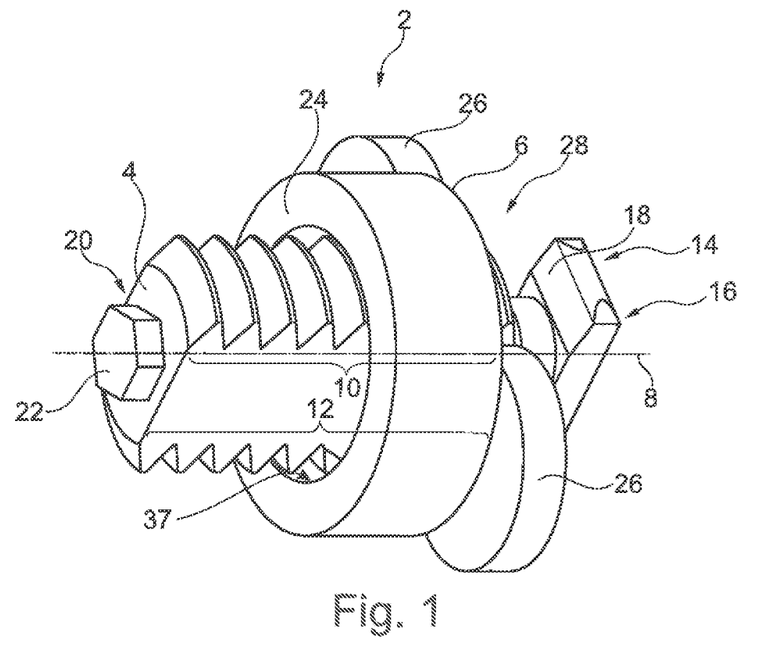
FIG. 1 shows a three-dimensional illustration of a fastening system according to an embodiment of the invention.

FIG. 1 shows a three-dimensional illustration of a fastening system 2. The fastening system 2 includes an anchoring element 4 and a supporting element 6. The general shape of the anchoring element 4 which has a longitudinal axis 8, a first toothed portion 10 and a second toothed portion 12, which are arranged on mutually opposite regions of the anchoring element 4 parallel to and at a distance from the longitudinal axis 8, can be seen particularly well in FIG. 1.

A form-fitting means 16 is arranged at a first end 14 and, in a symmetrical shape, has two mutually oppositely arranged engagement means 18. The position of the engagement means in a plane perpendicular to the longitudinal axis 8 corresponds to the positions of the toothed regions 10 and 12. At a second end 20 arranged opposite the first end 14, a device 22 for initiating rotation of the anchoring element 4 is arranged in the form of a tool-holding profile. This can be, for example, a hexagonal profile. In the illustration, the hexagonal profile is in the form of a protrusion. However, it is also conceivable to form a depression with such a profile or a similar profile.

The supporting element 6 is determined in particular by an annular bushing 24 which has an opening 37 through which the anchoring element 4 extends. The precise configuration of the annular bushing 24 will be explained in more detail in the drawings below. As is apparent in FIG. 1, two protrusions 26 are arranged on one side of the annular bushing 24 and can be brought into engagement with grid openings, shown below, in a rail. On a side of the annular bushing 24 that faces the protrusions 26, a supporting surface 28 is provided, with which the supporting element 6 rests on said rail.

Figure 2:
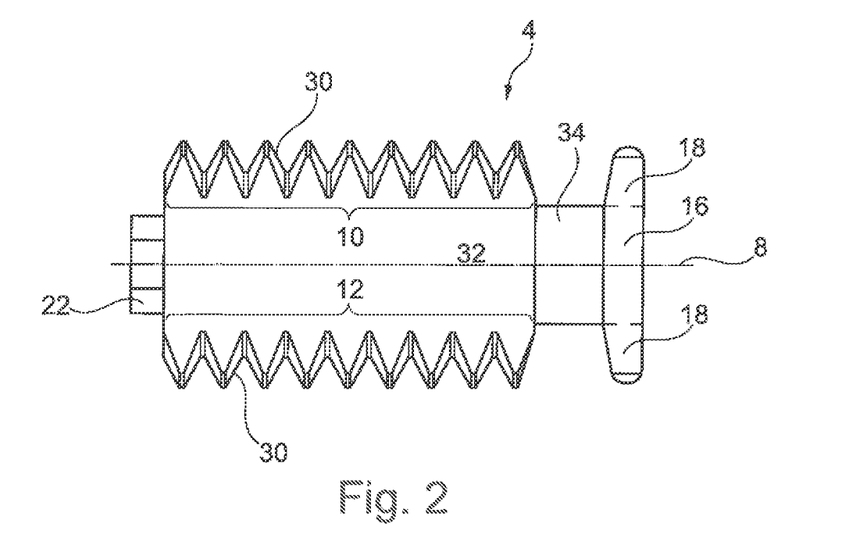
FIG. 2 shows the anchoring element in a side view.

FIG. 2 shows the anchoring element 4 in a side view. The two toothed portions 10 and 12 can be seen particularly well here. The two toothed portions 10 and 12 have the second radial toothing 30 mentioned below and above. The latter is characterized in that it has a type of fluted structure, such as a screw thread, but the individual threads or flutes do not have any pitch along the longitudinal axis 8. In principle, the profile cross-sectional area of the anchoring element 4 is based on a circular shape, with flattened flanks 32 which are free from the second radial toothing 30 being provided.

The form-fitting means 16 is apparent here in the form of two engagement elements 18 which are designed as feet offset by 180° with respect to each other about the longitudinal axis 8 of the anchoring element 4. A substantially cylindrical portion 32 is provided between the form-fitting means 16 and the toothed portions 10 and 12 and constitutes a connection between said regions. The anchoring element 4 is preferably formed in one piece and is produced in particular from a metallic material.

Figure 3:
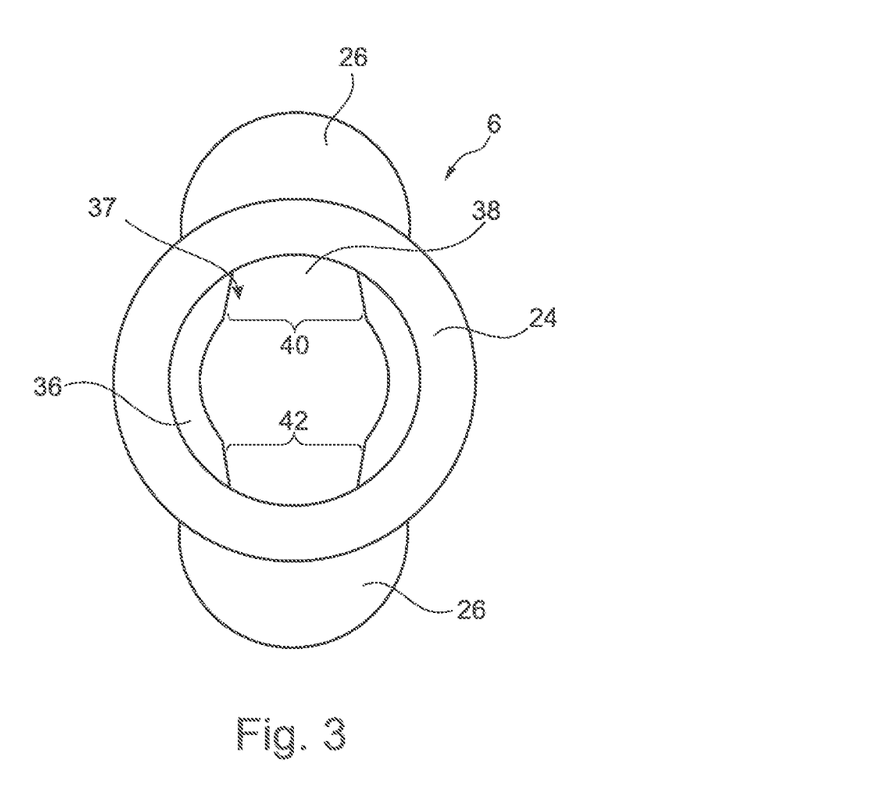
FIG. 3 shows a top view of the supporting element.

FIG. 3 shows a top view of the supporting element 6. Here, the annular bushing 24 is illustrated with a first radial toothing 36 which is located on two mutually opposite regions of an interior space 38 of the supporting element 6, said interior space adjoining the opening 37. Between the two regions of the first radial toothing there is an arrangement of two mutually opposite gaps 40 and 42 enabling the anchoring element 4 to be plugged through without any resistance. Consequently, the anchoring element 4 can be plugged through the annular bushing 24, wherein, after rotation by 90° about the longitudinal axis 8 of the anchoring element 4, the second radial toothing 30 of the toothed portions 10 and 12 enters into engagement with the first radial toothing 36 of the annular bushing 24. On account of the flutes of the first toothing 36 and of the second toothing 30 being arranged parallel to one another, a movement along the longitudinal axis 8 in said second rotational position is no longer possible.

Figure 4:
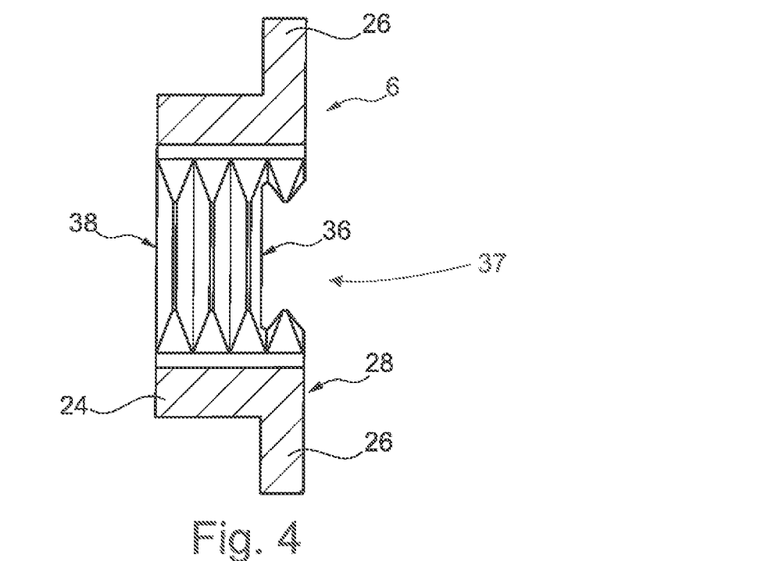
FIG. 4 shows a sectional illustration of the supporting element.

For clarification purposes, a sectional illustration of the supporting element 6 with the first toothing 36 located therein is illustrated in FIG. 4.

Figure 5:
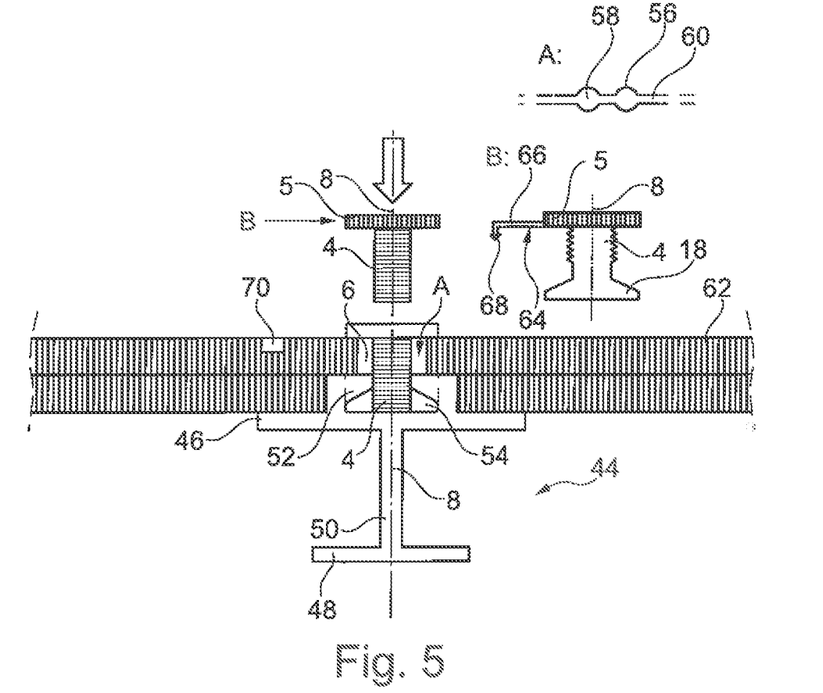
FIG. 5 shows the insertion of the fastening system into a component to be fastened, and a floor rail.

FIG. 5 shows the use of the fastening system 2 and the sequence in practice. A seat rail 44 having an upper flange 46, a lower flange 48 and a web 50 located in between is shown. A seat rail profile is arranged on an upper side of the upper flange 46 and has a projection 52 which, with the upper flange 46, encloses a cavity 54. A smaller detailed view A illustrates a possible opening contour 56. The latter has a plurality of grid openings 58 through which a central slot 60 passes. A rail 44 of this type, which is also known as a "Douglas Rail", can be found in aircraft cabins which are customary nowadays.

The anchoring element 4 can be plugged into the cavity 54 of the seat rail 44 through the supporting element 6 which, by way of example, is arranged in a base surface 62 of a fitting part. The orientation of the anchoring element 4 or of the form-fitting means 16 can be adapted to the central slot 60 for the plugging-in operation. In addition, the orientation of the supporting element 6 can be oriented in the same manner, and therefore the protrusions 26 are placed into two spaced-apart grid openings 58 of the seat rail 44. If the supporting element 6 is consequently positioned in a corresponding manner on the seat rail 44 and the protrusions 26 are latched into two grid openings 58, the anchoring element 4 can be introduced through the supporting element 6 into the cavity 54 of the seat rail 44 in order to then subsequently be rotated. For this purpose, a device 5 is provided on the anchoring element 4. Said device can be designed by way of example as a ridged knob. Of course, other variants which are fixed or removable are also conceivable.

A detailed view B furthermore shows a fixing device 64 which is attached to the anchoring element 4 and has a lever 66 and a connecting element 68 in the form of a latching element. The lever 66 can be arranged on the anchoring element 4 in an articulated manner, and therefore the connecting element 68 is movable vertically with respect to the base surface 62 at least within certain limits. When the anchoring element 4 has been rotated, the connecting element 68 can be latched into a corresponding opening 70 in the base surface 62. As a result, rotation of the anchoring element about the vertical longitudinal axis 8 thereof can be prevented. In addition, the second rotational position can be found very easily by movement of the lever 66 and subsequent plugging in of the connecting element 68.

Figure 6:
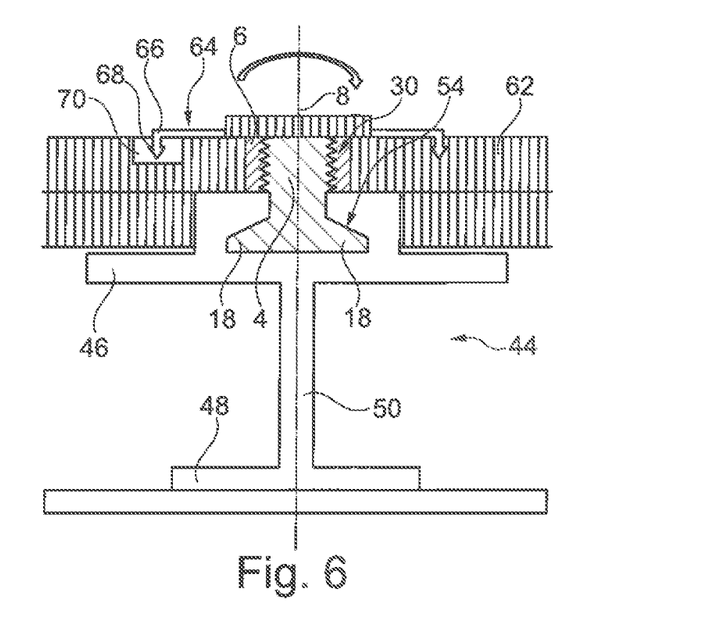
FIG. 6 shows the locking of the fastening system in a sectional illustration.

This is illustrated in particular in FIG. 6. The connecting element 68 is plugged here into the opening 70. Furthermore, the engagement elements of the form-fitting means 16 fill the cavity 54, and therefore the anchoring element can no longer be released from the rail 44. In this position, the first toothing 36 and the second toothing 30 also intermesh such that the adjusted position of the supporting element 6 is kept.

Figure 7:
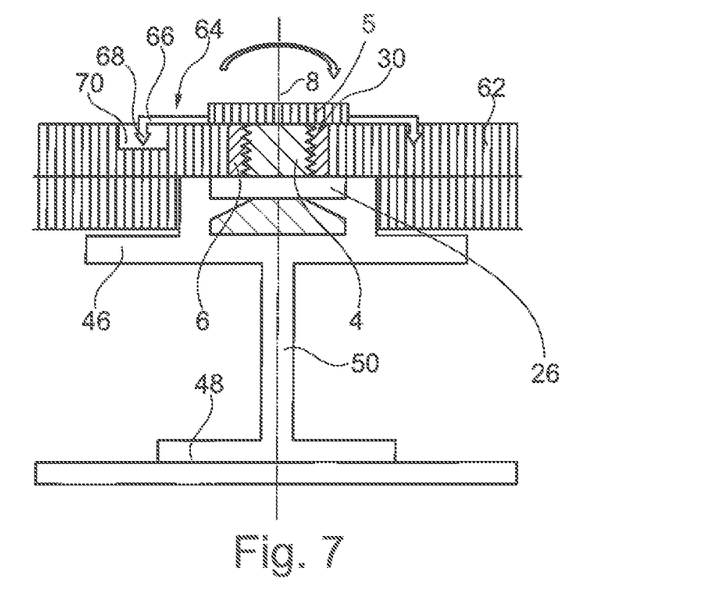
FIG. 7 shows the locking of the fastening system in a sectional illustration at a different position of the rail in comparison to FIG. 6.

FIG. 7 shows a sectional view as in FIG. 6, but at a different point of the rail 44. A projection 26 which enters into a form fit with the rail 44 is apparent here.

Figure 8:
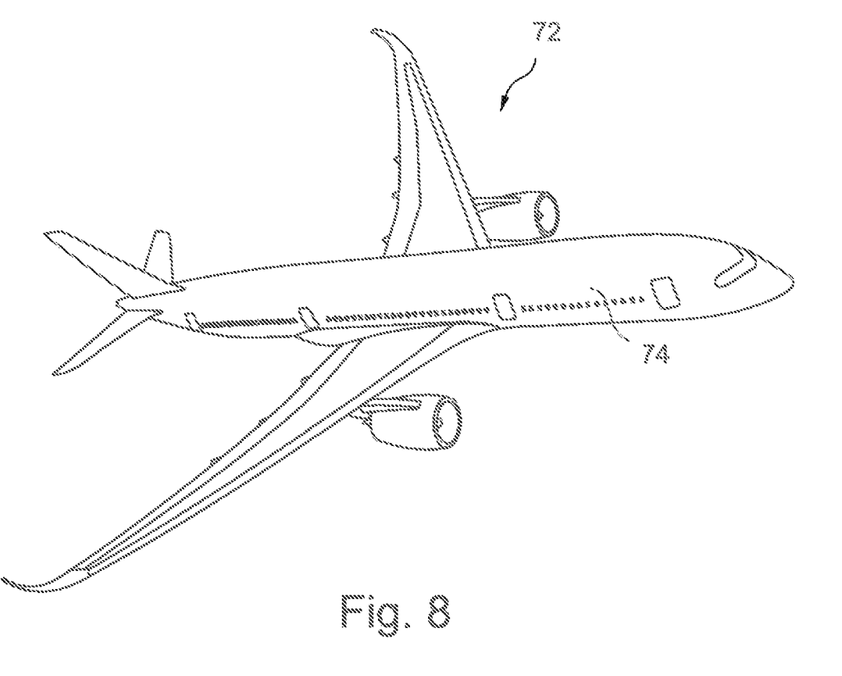
FIG. 8 shows an aircraft with a cabin which has a floor rail and a fitting part to be fastened thereto.

FIG. 8 finally shows a commercial aircraft (72) which is provided with a cabin (74) in which a fitting part is fastened to a cabin floor in a seat rail 44 with the aid of the fastening system 2.

It is additionally noted that "having" does not rule out other elements or steps, and the words "a" or "an" do not rule out a multiplicity. It is also noted that features that have been described with reference to one of the above exemplary embodiments can also be used in combination with other features of other exemplary embodiments described above. Reference signs in the claims are not to be regarded as restrictive.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A fastening system for fastening fittings to a rail in a vehicle, the fastening system comprising:
a supporting element including a supporting surface, an opening, and a first radial toothing arranged in an interior space adjoining the opening and limited to two radial portions lying opposite in the interior space; and
an elongate anchoring element with a longitudinal axis, and the elongate anchoring element including a first end, a second end arranged along the longitudinal axis opposite the first end, and a second radial toothing limited to two mutually opposite radial portions;
wherein the opening of the supporting element and the first radial toothing are configured in a corresponding manner to the anchoring element such that the anchoring element, in a first rotational position about the longitudinal axis, is introduced without resistance into the opening and, in a second rotational position, the anchoring element engages produces an engagement between the first radial toothing and the second radial toothing; and
wherein at least one form-fitting means is arranged at the first end of the anchoring element and can be introduced into an opening contour of a rail, for producing and releasing a form-fitting connection to an undercut of a rail.

2. The fastening system according to claim 1, further comprising a fixing device to fix a relative position between the anchoring element and the supporting element.

3. The fastening system according to claim 2, wherein the fixing device is a lever connected pivotably about an axis to the anchoring element and, at an end facing away from the anchoring element, has a connecting element for connecting to the fitting part or to a structure-mounted point.

4. The fastening system according to claim 1, wherein the supporting element has a supporting surface on which at least one protrusion is arranged, said protrusion being configured to enter into a form fit with an opening contour of the rail.

5. The fastening system according to claim 4, wherein two protrusions are arranged on mutually opposite sides of the supporting surface, said protrusions being configured to enter into engagement with two spaced-apart grid openings in the opening contour of the rail.

6. The fastening system according to claim 1, wherein the supporting element is an annular bushing in which the opening is arranged.

7. The fastening system according to claim 1, wherein the form-fitting means has two mutually oppositely arranged engagement elements which follow the second radial toothing along the longitudinal axis of the anchoring element.

8. The fastening system according to claim 1, further comprising a device to initiate a rotation of the anchoring element about the longitudinal axis, the device arranged at the second end of the anchoring element.

9. The fastening system according to claim 1, wherein a substantially cylindrical, untoothed portion is arranged between the form-fitting means and the second radial toothing.

10. A vehicle cabin comprising:
at least one rail;
at least one fitting part; and
a fastening system to fasten the at least one fitting part to the at least one rail, the fastening system comprising:
a supporting element with a supporting surface, an opening, and a first radial toothing arranged in an interior space adjoining the opening and limited to two radial portions lying opposite in the interior space; and
an elongate anchoring element with a longitudinal axis, a first end, a second end arranged along the longitudinal axis opposite the first end, and a second radial toothing limited to two mutually opposite radial portions;
wherein the opening of the supporting element and the first radial toothing are configured in a corresponding manner to the anchoring element such that the anchoring element, in a first rotational position about the longitudinal axis, is introduced without resistance into the opening and, in a second rotational position, produces an engagement between the first radial toothing and the second radial toothing; and
wherein at least one form-fitting means is arranged at the first end of the anchoring element and can be introduced into an opening contour of a rail, for producing and releasing a form-fitting connection to an undercut of a rail.

11. The vehicle cabin according to claim 10, wherein the rail is a floor rail which is integrated in a cabin floor and has an opening contour facing the cabin.

12. A vehicle comprising the vehicle cabin according to claim 10.

13. The vehicle according to claim 12, wherein the vehicle is an aircraft.

14. A fastening system configured to fasten a fitting to a rail in a vehicle, the fastening system comprising:
an annular supporting element including an annular bushing, and an opening extending through the annular bushing, wherein an inner surface of the annular bushing defines the opening and the inner surface includes a first radial toothing extending radially inward from the inner surface into the opening and the first radial toothing extends only partially around a perimeter of the inner surface and first gaps divide the first radial toothing into first and second portions of the first radial toothing, wherein the first gaps extend longitudinally through the opening;
an elongate anchoring element including a first end, a second end arranged along the longitudinal axis opposite the first end, an outer surface between the first and second ends, a second radial toothing extending radially outward from outer surface and the second radial toothing extending only partially around a perimeter of the outer surface, and second gaps on the outer surface divide the second radial toothing into first and second portions of the second radial toothing, wherein the second gaps are on opposite sides of the outer surface and each of the second gaps are wider than each of the first and second portions of the first radial toothing, wherein the opening of the annular bushing is configured to receive the elongate anchoring element such that the first and second portions of the first radially toothing pass through the first gaps without engaging the first radial toothing, and the supporting element is configured such that the first annular toothing engages the second annular toothing as the elongate anchoring element is turned after the elongate anchoring element is inserted in the opening; and wherein at least one form-fitting device is arranged at the first end of the anchoring element and is configured to be introduced into an opening contour of the rail.

* * * * *